(12) United States Patent
Kim

(10) Patent No.: US 12,257,975 B2
(45) Date of Patent: Mar. 25, 2025

(54) VEHICLE AND CONTROL METHOD THEREOF

(71) Applicants: Hyundai Motor Company, Seoul (KR); Kia Corporation, Seoul (KR)

(72) Inventor: Sinjung Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 324 days.

(21) Appl. No.: 18/060,081

(22) Filed: Nov. 30, 2022

(65) Prior Publication Data

US 2023/0242072 A1 Aug. 3, 2023

(30) Foreign Application Priority Data

Feb. 3, 2022 (KR) .......................... 10-2022-0013974

(51) Int. Cl.
*B60R 25/01* (2013.01)
*B60R 25/24* (2013.01)

(52) U.S. Cl.
CPC .............. *B60R 25/01* (2013.01); *B60R 25/24* (2013.01); *B60R 2325/103* (2013.01); *B60R 2325/20* (2013.01)

(58) Field of Classification Search
CPC ..................... B60R 25/01; B60R 25/24; B60R 2325/103; B60R 2325/20
See application file for complete search history.

(56) References Cited

U.S. PATENT DOCUMENTS

| 10,493,956 | B2 | 12/2019 | Wisbauer | |
|---|---|---|---|---|
| 2010/0178866 | A1 | 7/2010 | Jalkanen | |
| 2015/0097652 | A1* | 4/2015 | Ishida | B60R 11/0264 |
| | | | | 340/5.61 |
| 2015/0172925 | A1 | 6/2015 | Leppanen | |
| 2018/0222444 | A1* | 8/2018 | Nishiyama | B60R 25/245 |
| 2020/0169297 | A1* | 5/2020 | Kim | G06K 19/0723 |
| 2021/0370877 | A1* | 12/2021 | Peterson | B60R 16/023 |

FOREIGN PATENT DOCUMENTS

| KR | 20110093602 A | 8/2011 |
|---|---|---|
| KR | 20190105776 A | 9/2019 |
| KR | 200297201 Y1 | 12/2022 |

* cited by examiner

*Primary Examiner* — Nabil H Syed
(74) *Attorney, Agent, or Firm* — MCDONNELL BOEHNEN HULBERT & BERGHOFF LLP

(57) ABSTRACT

Disclosed is a vehicle capable of performing digital key authentication more smoothly. The vehicle includes a reader provided to perform communication with a digital key through near field communication (NFC), and a controller configured to perform a preset function of the vehicle based on a success of a transaction with the digital key through the reader, wherein the reader operates in a first mode of detecting the presence of the digital key based on the success of the transaction, and does not start the transaction even when the digital key is detected while operating in the first mode.

20 Claims, 7 Drawing Sheets

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2022-0013974, filed on Feb. 3, 2022, in the Korean Intellectual Property Office, the disclosure of which is incorporated by reference herein in its entirety.

TECHNICAL FIELD

The disclosure relates to a vehicle and a control method thereof, and more particularly, to a vehicle capable of more smoothly performing digital key authentication and a control method thereof.

BACKGROUND

Near field communication (NFC), which is one of radio frequency identification (RFID) technologies, is a non-contact communication technology using a frequency band of 13.56 MHz, and is one of communication technologies with relatively good security and low price because a communication distance thereof is short.

Because both data reading and writing functions may be used in NFC, the NFC is widely used not only for payment but also for information transmission and access control.

Due to the convenience of NFC as described above, the NFC is being used as an authentication technology for vehicle access.

However, when a user continuously tags a digital key to an NFC reader provided in a vehicle, an unintended vehicle function may be executed or an intended vehicle function may not be executed.

SUMMARY

It is an aspect of the disclosure to provide a vehicle and a control method thereof capable of repeating or aborting a transaction depending on a result of the transaction after a digital key and the transaction of the vehicle are terminated.

Additional aspects of the disclosure will be set forth in part in the description which follows and, in part, will be obvious from the description, or may be learned by practice of the disclosure.

In accordance with an aspect of the disclosure, a vehicle includes a reader provided to perform communication with a digital key through near field communication (NFC), and a controller configured to perform a preset function of the vehicle based on a success of a transaction with the digital key through the reader, wherein the reader operates in a first mode of detecting the presence of the digital key based on the success of the transaction, and does not start the transaction even when the digital key is detected while operating in the first mode.

The reader may transmit a polling signal for detecting the existence of the digital key at a preset period while operating in the first mode.

The reader may transmit the polling signal at a period shorter than the preset period when a response signal corresponding to the polling signal is not received.

The reader may transmit the polling signal at the preset period based on reception of the response signal corresponding to the polling signal while the polling signal is transmitted at the period shorter than the preset period.

The reader may operate in a second mode in which the transaction is waiting based on not receiving the response signal corresponding to the polling signal while the polling signal is transmitted at the period shorter than the preset period.

The reader may operate in a second mode in which the transaction is waiting, based on the operation in the first mode for a preset time.

The reader may operate in a third mode for starting the transaction based on detecting a change in an electromagnetic field or receiving a starting command from the controller while the second mode is operated.

The reader may accumulate the number of failures based on a failure of the transaction, operate in a third mode for starting the transaction based on the accumulated number of failures being less than a preset value, and operate in the first mode based on the accumulated number of failures being equal to the preset value.

The reader may be provided on a handle of a door, and the controller may lock or unlock the door based on the success of the transaction.

The reader may be provided inside the vehicle, and the controller may impart a starting authority to a starting system of the vehicle based on the success of the transaction.

In accordance with an aspect of the disclosure, a control method of a vehicle, which includes a reader provided to perform communication with a digital key through near field communication (NFC), includes performing, by a controller of the vehicle, a preset function of the vehicle based on a success of a transaction with the digital key through the reader, operating, by the reader, in a first mode to detect the presence of the digital key based on the success of the transaction, and not starting the transaction by the reader even when the digital key is detected while operating in the first mode.

The operating of the reader in the first mode may include transmitting a polling signal for detecting the existence of the digital key at a preset period.

The operating of the reader in the first mode may include transmitting the polling signal at a period shorter than the preset period when a response signal corresponding to the polling signal is not received.

The operating of the reader in the first mode may include transmitting the polling signal at the preset period based on reception of the response signal corresponding to the polling signal while the polling signal is transmitted at the period shorter than the preset period.

The control method may further include operating, by the reader, in a second mode in which the transaction is waiting based on not receiving the response signal corresponding to the polling signal while the polling signal is transmitted at the period shorter than the preset period.

The control method may further include operating, by the reader, in a second mode in which the transaction is waiting, based on the operation in the first mode for a preset time.

The control method may further include operating, by the reader, in a third mode to start the transaction based on detecting a change in an electromagnetic field or receiving a starting command from the controller while the second mode is operated.

The control method may further include accumulating, by the reader, the number of failures based on a failure of the transaction, operating in a third mode for starting the transaction based on the accumulated number of failures being less than a preset value, and operating in the first mode based on the accumulated number of failures being equal to the preset value.

The reader may be provided on a handle of a door, and the performing of the preset function of the vehicle by a controller of the vehicle based on the success of the transaction of the reader with the digital key may include locking or unlocking the door based on the success of the transaction.

The reader may be provided inside the vehicle, and the performing of the preset function of the vehicle by a controller of the vehicle based on the success of the transaction of the reader with the digital key may include imparting a starting authority to a starting system of the vehicle based on the success of the transaction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
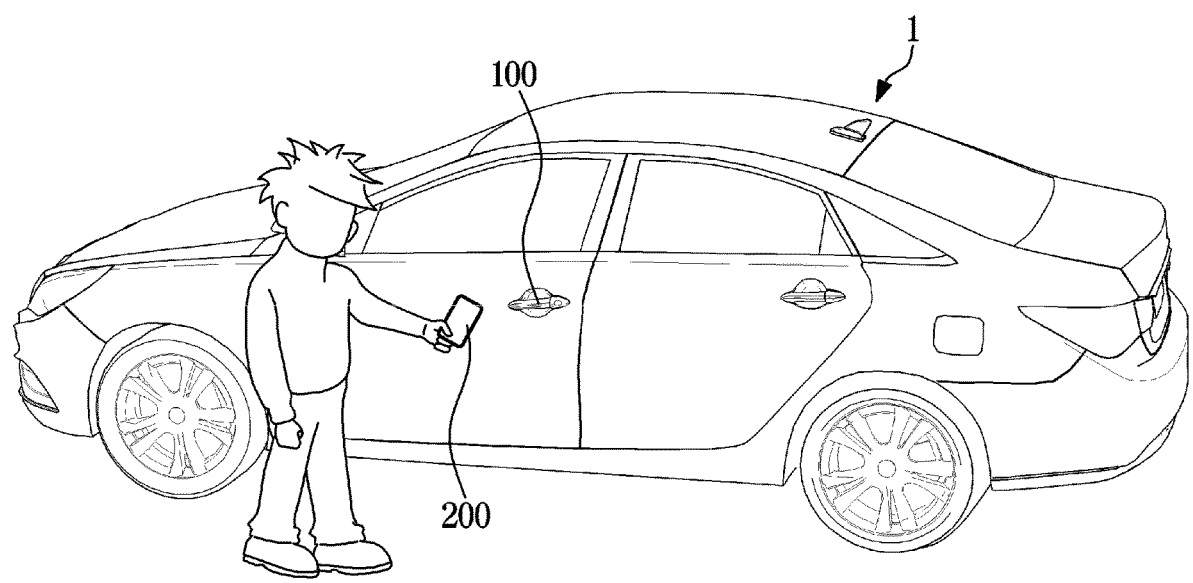
FIG. 1 illustrates an exterior of a vehicle according to an embodiment.

Advantages and features of the disclosure, as well as a method and devices for achieving them, will be made clear by the embodiments described below with reference to the accompanying drawings. However, the present disclosure is not limited to the embodiments disclosed below and may be implemented in various different forms, only the disclosed embodiments are provided such that the disclosure of the invention is complete, and to fully inform those of ordinary skill in the art to which the disclosure belongs, the scope of the present disclosure, and the disclosure is only defined by the scope of the claims.

Terms used in the disclosed specification will be briefly described, and the disclosure will be described in detail.

In the disclosed specification, general terms currently widely used as possible are selected while considering the functions in the disclosure, but these terms may vary depending on the intention or precedent of a person skilled in the art, the emergence of new technology, and the like. In addition, in a specific case, there may be a term arbitrarily selected by the applicant, and in this case, the meaning will be described in detail in the corresponding description of the disclosure. Therefore, the terms used in the disclosure should be defined based on the meaning of the terms and the overall content of the disclosure, not just the names of the terms.

Throughout the specification, when it is described that a part "includes" an element, it means that the element may further include other elements, not excluding the other elements unless specifically stated otherwise. The term 'part' used in this specification may be implemented as software or hardware such as FPGA and ASIC, and the term 'part' perform certain functions. However, the 'part' is not limited to software or hardware. The 'part' may be configured to be provided on an addressable storage medium or configured to reproduce one or more processors. Thus, as an example, the 'part' includes components such as software components, object-oriented software components, class components and task components, processes, functions, properties, procedures, subroutines, segments of program code, drivers, firmware, microcode, circuits, data, databases, data structures, tables, arrays and variables. The functionality provided within the components and 'parts' may be combined into a smaller number of components and 'parts' or further divided into additional components and 'parts'.

Hereinafter, embodiments of a vehicle and a control method of the vehicle will be described in detail with reference to the accompanying drawings so that a person skilled in the art to which the disclosure belongs may easily implement the embodiments. In order to clearly explain the disclosure, parts not related to the explanation will be omitted from the drawings. In addition, in the drawings, the same reference numerals denote the same components, and overlapping descriptions thereof will be omitted.

Figure 2:
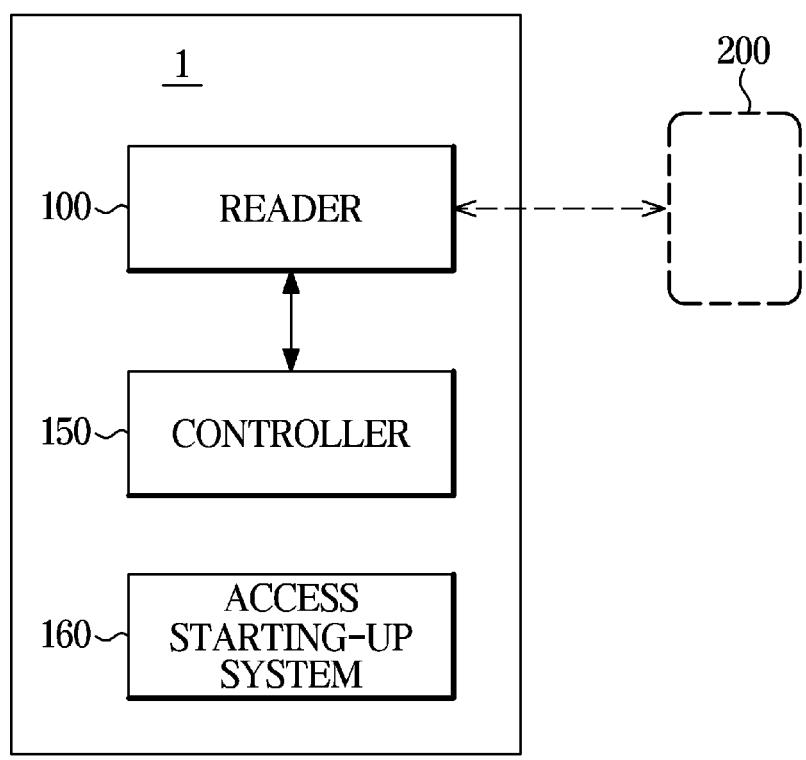
FIG. 2 is a block diagram illustrating a configuration of the vehicle according to an embodiment.

FIG. 1 illustrates an exterior of a vehicle according to an embodiment, and FIG. 2 is a block diagram illustrating a configuration of the vehicle according to an embodiment.

Referring to FIGS. 1 and 2, a vehicle 1 may include a reader 100 provided to perform communicating with a digital key 200, a controller 150 provided to perform indirectly communicating with the digital key 200 through the reader 100, and an access starting-up system 160 provided to be controlled by the controller 150.

According to various embodiments, the digital key 200 may include a short-range communication module.

For example, the digital key 200 may include an NEC module capable of performing NFC.

The digital key 200 may include not only a card-type key having the short-range communication module, but also various electronic devices having the short-range communication module.

For example, the digital key 200 may further include a user terminal device (e.g., smartphone), but an electronic device having the short-range communication module is not limited thereto.

The digital key 200 may have its own power supply device, but may perform communicating with the vehicle 1 using power derived from the reader 100 without the own power supply device.

For example, when the digital key 200 is implemented as a card key type, the card-type digital key 200 may perform communicating with the vehicle 1 using power derived from the reader 100 without its own power supply device.

As another example, when the digital key 200 is implemented as a smartphone, the digital key 200 may have its own power supply device.

The reader 100 may exchange data with the digital key 200 by performing short-range communication (e.g., NFC) with the digital key 200.

To this end, the reader 100 may include a short-range communication module (e.g., NFC module).

The short-range communication module may include a communication antenna capable of performing short-range communication (e.g., NFC), a matching device for processing a signal received from the communication antenna and/or a signal to be transmitted through the communication antenna, and an integrated circuit (e.g., NFC reader IC) corresponding to an MCU controlling the overall operation of the short-range communication module and a type of short-range communication.

The vehicle 1 may include the at least one reader 100. For example, the vehicle 1 may include a first reader provided on a door handle and/or a second reader provided inside the vehicle 1.

According to various embodiments, the vehicle 1 may further include a third reader provided in a trunk of the vehicle 1.

In this case, the second reader may perform a charging function of charging the digital key 200 (e.g., smartphone).

The user may impart various rights to the digital key 200 using a user interface device (e.g., AVN device) inside the vehicle 1.

For example, the user may dispose the digital key 200 in the second reader provided inside the vehicle 1 and impart various rights (e.g., access right, starting-up right, etc.) for the digital key 200 through the user interface device.

The digital key 200 may receive registration information and/or right information of the vehicle 1 from the second reader through the NFC.

To this end, the digital key 200 may include at least one memory.

The reader 100 may receive necessary data from the digital key 200 through an NFC initiation process defined in ISO 14443 and a data transaction process defined in ISO 7816.

The reader 100 may transmit data received from the digital key 200 to the controller 150, and the controller 150 may perform authentication of the digital key 200 based on the data received from the digital key 200.

In this case, the reader 100 may transmit the data received from the digital key 200 to the controller 150 through a vehicle communication network (e.g., CAN communication).

Also, the reader 100 may transmit data received from the controller 150 through the vehicle communication network (e.g., CAN communication) to the digital key 200 through a data transaction.

The vehicle communication network may include Ethernet, media oriented systems transport (MOST), FlexRay, a controller area network (CAN), a local interconnect network (LIN), and the like.

The controller 150 may authenticate the digital key 200 based on data on the digital key 200 received through the reader 100, and perform various functions related to the vehicle 1 based on a success of authentication of the digital key 200.

In this specification, a success of the transaction of the controller 150 with the digital key 200 may refer to a success of authentication of the digital key 200, and a failure of the transaction of the controller 150 with the digital key 200 may refer to a failure of authentication of the digital key 200 or a request for additional authentication information from the digital key 200.

When additional authentication information is requested from the digital key 200, the digital key 200 may be implemented as a user terminal (e.g., smartphone).

For example, when the digital key 200 is implemented as a smartphone, the controller 150 may request the digital key 200 for authentication information through the smartphone in addition to the registration information of the vehicle 1.

The authentication information through the smartphone may include PIN information and/or biometric authentication information (e.g., face authentication, fingerprint authentication, iris authentication, etc.).

The user may authenticate the digital key 200 by tagging the digital key 200 to the reader 100 and execute a function of the vehicle 1 related to the authentication success.

For example, the user may tag the digital key 200 to the door handle to lock or unlock a door of the vehicle 1.

The controller 150 may control the access starting-up system 160 to unlock the door based on a success of the transaction with the digital key 200 tagged to the door handle when the door is in a locked state.

The controller 150 may also control the access starting-up system 160 to lock the door based on the success of the transaction with the digital key 200 tagged to the door handle when the door is in an unlocked state.

The access starting-up system 160 may include a door locking device and/or a starting system.

The door locking device may lock or unlock the door based on a control signal of the controller 150. The starting system may be given a starting authority from the controller 150.

When the starting system is given the starting authority, the starting of the vehicle 1 may be turned on based on the user pressing a starting button to turn on the starting.

Conversely, when the starting system is not given the starting authority, the starting of the vehicle 1 may not turn on even when the user presses the starting button.

The controller 150 may include at least one memory storing a program for performing an operation related to an access starting-up function of the vehicle 1 and at least one processor for executing the stored program.

When the controller 150 includes a plurality of the memories and a plurality of the processors, the plurality of memories and the plurality of processors may be integrated into one chip or may be physically separated. Each of the memories may include a volatile memory for temporarily storing data, such as a static random access memory (S-RAM) and a dynamic random access memory (DRAM). Also, each of the memories may include a non-volatile memory for long-term storage of control programs and control data, such as a read only memory (ROM), an erasable programmable read only memory (EPROM), and an electrically erasable programmable read only memory (EEPROM). Each of the processors may include various logic circuits and arithmetic circuits, process data according to a program provided from each of the memories, and generate a control signal depending on a processing result.

When the starting of the vehicle 1 is turned off, the controller 150 may control the access starting-up system 160 to lock the door based on a success of the transaction with the digital key 200 tagged to the second reader provided inside the vehicle 1.

When the trunk is in a locked state, the controller 150 may control the access starting-up system 160 to unlock the trunk based on a success of the transaction with the digital key 200 tagged to the third reader provided in the trunk.

Although various components of the vehicle 1 have been described above, new components may be added or the described components may be omitted within a general technical scope.

Figure 3:
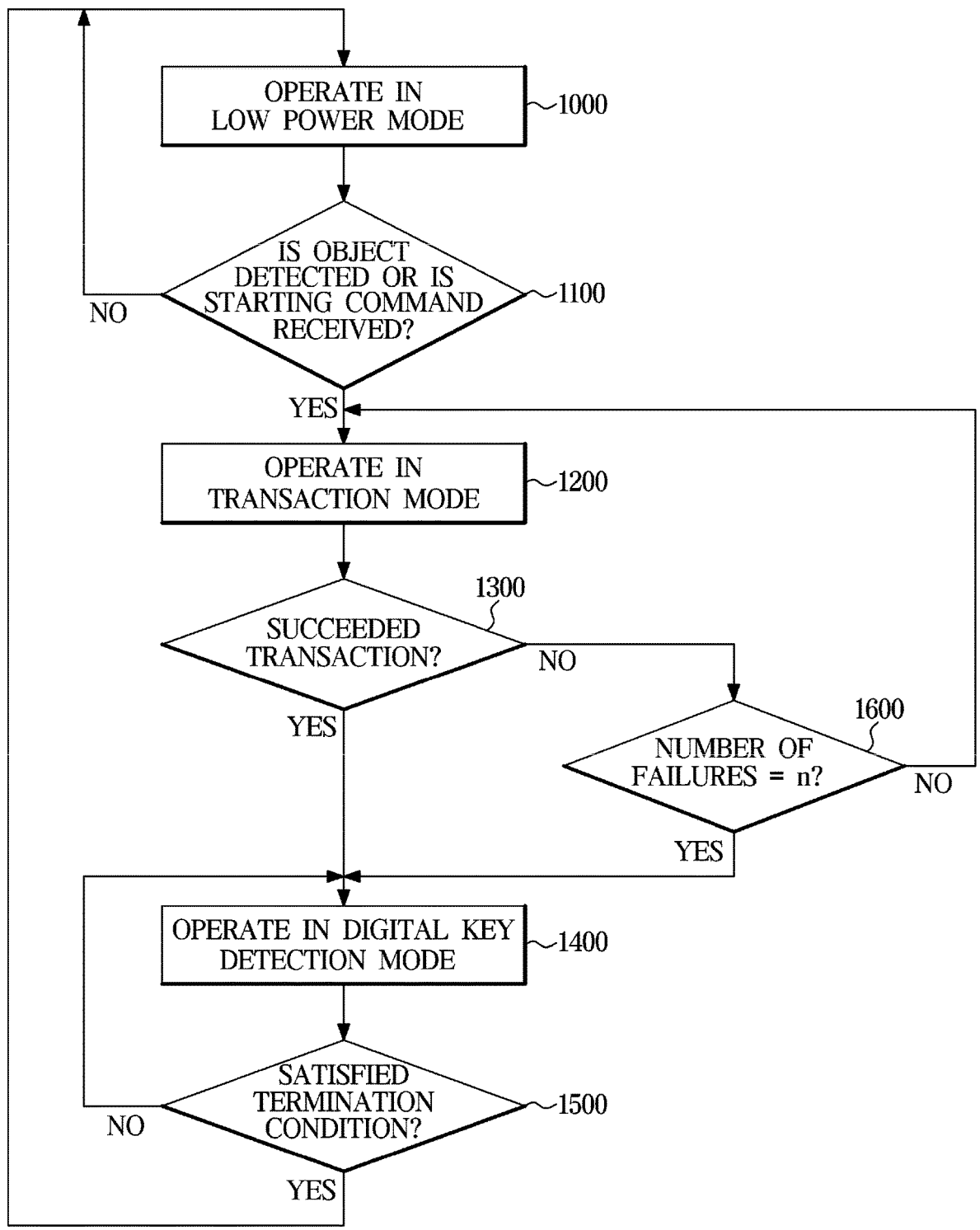
FIG. 3 is a flowchart illustrating a process in which an operation mode of the reader is changed according to an embodiment.
Figure 4:
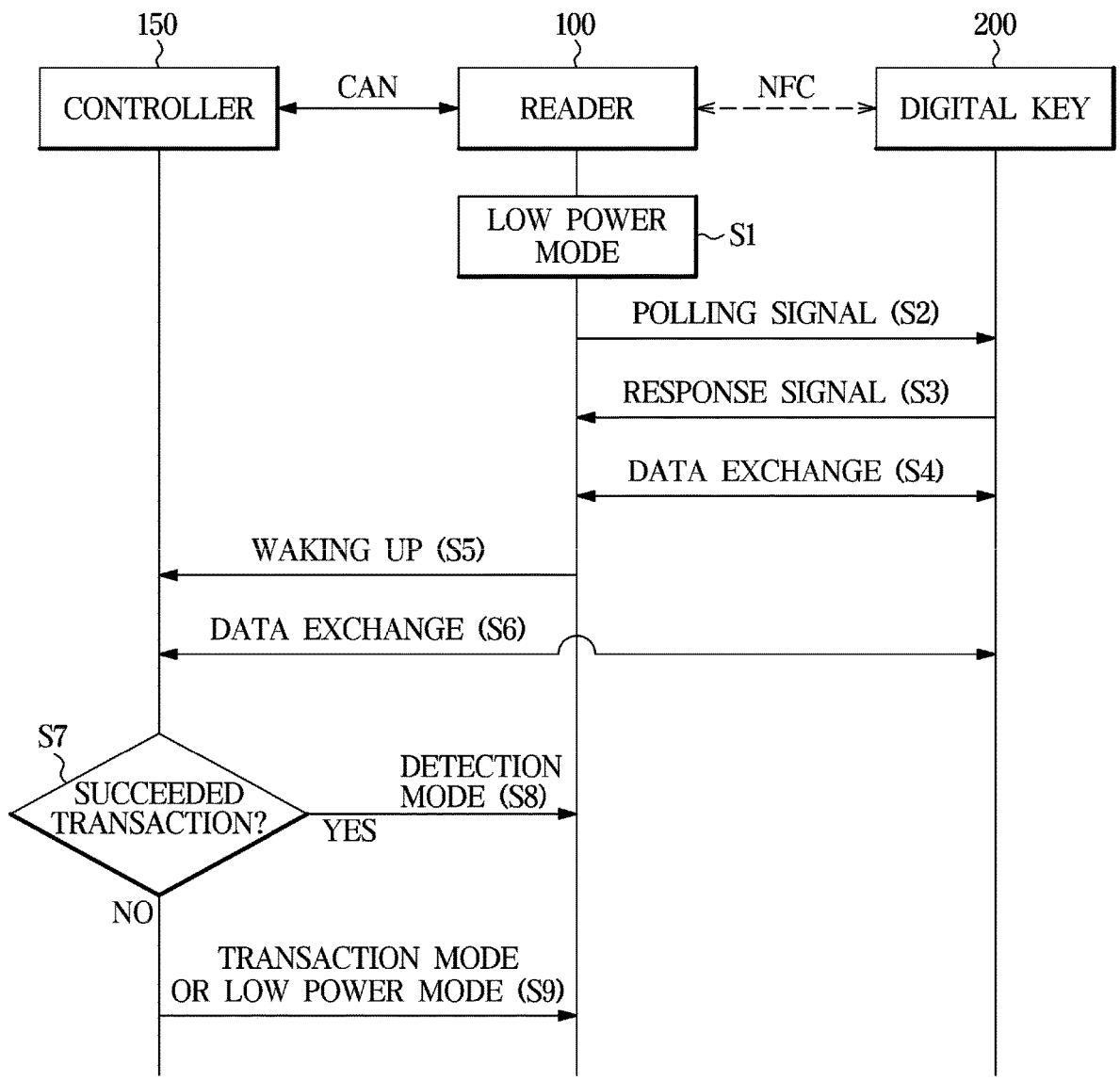
FIG. 4 is a diagram illustrating communication processes between a digital key, a reader, and a controller.

FIG. 3 is a flowchart illustrating a process in which an operation mode of the reader is changed according to an embodiment and FIG. 4 is a diagram illustrating communication processes between the digital key, the reader, and the controller.

Referring to FIGS. 3 and 4, the reader 100 may operate in a low power mode until preset condition is satisfied (S1 in FIG. 4; 1000 in FIG. 3).

In an embodiment, the low power mode may be defined as a mode in which a transaction with the digital key 200 is waiting.

The low power mode may also be defined as a sleep mode, and in the low power mode, the reader 100 may detect the proximity of the digital key 200 and/or even the proximity of a human body while consuming a small amount of power.

For example, the reader 100 may detect a change in an electromagnetic field depending on the proximity of the digital key 200 and/or the proximity of the human body.

To this end, the reader 100 may measure an amplitude or a phase of an antenna signal received through the communication antenna in the low power mode. The reader 100 may further include a low-power capacitive sensor.

The reader 100 may prevent power consumption of the vehicle 1 by operating in the low power mode in a situation where short-range communication (e.g., NFC) is not required.

The reader 100 may operate in a transaction mode (1200 in FIG. 3) based on detecting a change in the electromagnetic field or receiving a starting command from the controller 150 (YES of 1100 in FIG. 3).

For example, the reader 100 may measure the amplitude or phase of the antenna signal received through the communication antenna in the low power mode, and may be switched from the low power mode to the transaction mode when a change in the electromagnetic field is detected.

As another example, the controller 150 may transmit the starting command for switching the reader 100 to the transaction mode, based on detecting an approach of the user through the proximity sensor (e.g., ultrasonic sensor) of the vehicle 1, detecting an approach of the user terminal through a wireless communication module (e.g., Bluetooth communication module, UWB communication module, etc.) of vehicle 1, or detecting a contact of the user with the steering wheel of the vehicle 1 through a contact sensor (e.g., touch sensor) of the vehicle 1.

The transaction mode is a mode for the reader 100 to start the transaction with the digital key 200, and refers to a mode in which the reader 100 may exchange data with the digital key 200 through the NFC. As an example, the transaction mode may be defined as a normal polling mode.

In the transaction mode, the reader 100 may receive necessary data from the digital key 200 through the NFC initiation process defined in ISO 14443 and the data transaction process defined in ISO 7816.

Also, in the transaction mode, the reader 100 may transmit data received from the digital key 200 to the controller 150 and transmit data received from the controller 150 to the digital key 200.

As an example, the reader 100 may transmit a polling signal (S2) in the transaction mode, and the digital key 200 receiving the polling signal may transmit a response signal (S3) corresponding to the polling signal (S2).

The reader 100 may confirm the presence of the digital key 200 based on the reception of the response signal (S3) from the digital key 200.

The reader 100 may exchange various data (S4) with the digital key 200 based on the reception of the response signal (S3) from the digital key 200.

The data exchanged between the reader 100 and the digital key 200 may be data corresponding to the NFC initiation process defined in ISO 14443.

For example, the digital key 200 may transmit UID data to the reader 100, the reader 100 may transmit a selection signal for the UID of the digital key 200, the digital key 200 may transmit a select acknowledgment (SAK) signal in response to the selection signal of the reader 100, the reader 100 may transmit an application protocol data unit command (APDU-C) signal to the digital key 200, and the digital key 200 may transmit an AMU response (APDU-R) signal in response to the APDU-C signal.

The reader 100 may identify the digital key 200 based on data received from the digital key 200. For example, the reader 100 may identify the type of the digital key 200 (e.g., card or smartphone).

The reader 100 may transmit a wakeup signal for waking up the controller 150 (S5) based on the completion of data exchange corresponding to the NFC initiation process.

The controller 150 may be waked up based on the reception of the wakeup signal from the reader 100, and the reader 100 may transmit data on the digital key 200 to the waked-up controller 150.

After the NFC Initiation process, the controller 150 may execute the transaction with the digital key 200 through the reader 100.

For example, the controller 150 may transmit data to the reader 100 through the vehicle communication network, and the reader 100 may transmit the data received from the controller 150 to the digital key 200 through the NFC.

Also, the digital key 200 may transmit data to the reader 100 through the NFC, and the reader 100 may transmit the data received from the digital key 200 to the controller 150 through the vehicle communication network.

As such, the controller 150 and the digital key 200 may exchange data with each other (S6).

In the transaction process, the controller 150 may transmit the APDU-C signal to the digital key 200, and in response to this, the digital key 200 may transmit the APDU-R signal to the controller 150.

The controller 150 may authenticate the digital key 200 based on the data transmitted from the digital key 200. The data transmitted from the digital key 200 may include encryption data corresponding to the vehicle 1.

The controller 150 may determine that the transaction with the digital key 200 succeeds, based on the encryption data corresponding to the vehicle 1 being included in the data transmitted from the digital key 200.

Conversely, the controller 150 may determine that the transaction with the digital key 200 has failed based on the encryption data corresponding to the vehicle 1 not being included in the data transmitted from the digital key 200.

The controller 150 may transmit a transaction success message (S8) to the reader 100 based on the success of the transaction with the digital key 200 (YES in S7).

As another example, the controller 1.50 may transmit a command (S8) for operating the reader 100 in the digital key detection mode based on the success of the transaction with the digital key 200 (YES in S7).

In addition, the controller 150 may perform a preset function of the vehicle 1 based on the success of the transaction with the digital key 200 (YES in S7).

As an example, the controller 150 may impart the starting authority to the starting system of the vehicle 1 based on a success of the transaction with the digital key 200 through the first reader.

As another example, the controller 150 may lock or unlock the door based on the success of the transaction with the digital key 200 through the second reader.

As another example, the controller 150 may lock or unlock the trunk based on the success of the transaction with the digital key 200 through the third reader.

The controller 150 may transmit a transaction failure message (S9) to the reader 100 based on the failure of the transaction with the digital key 200 (NO in S7).

In the above-described processes (S4 to S6), when data is not received from the digital key 200 as a distance between the digital key 200 and the reader 100 increases, the transaction may be regarded as failed.

As another example, the controller 150 may transmit a command (S9) for operating the reader 100 in the low power mode or the transaction mode based on the failure of the transaction with the digital key 200 (No in S7).

In an embodiment, the reader 100 may operate (1400) in the digital key detection mode for detecting the presence of digital key 200 based on the success of the transaction (YES in 1300).

As an example, the reader 100 may operate in a digital key detection mode based on reception of the transaction success message from the controller 150 or the reception of the command for operating the reader 100 in the digital key detection mode.

The digital key detection mode refers to a mode in which only the existence of the adjacent digital key 200 is detected and a series of processes (the NFC initiation process defined in ISO 14443 and the data transaction process defined in ISO 7816) for the transaction are not executed.

That is, the reader 100 may not start the transaction even when the digital key 200 is detected while operating in the digital key detection mode.

Figure 5:
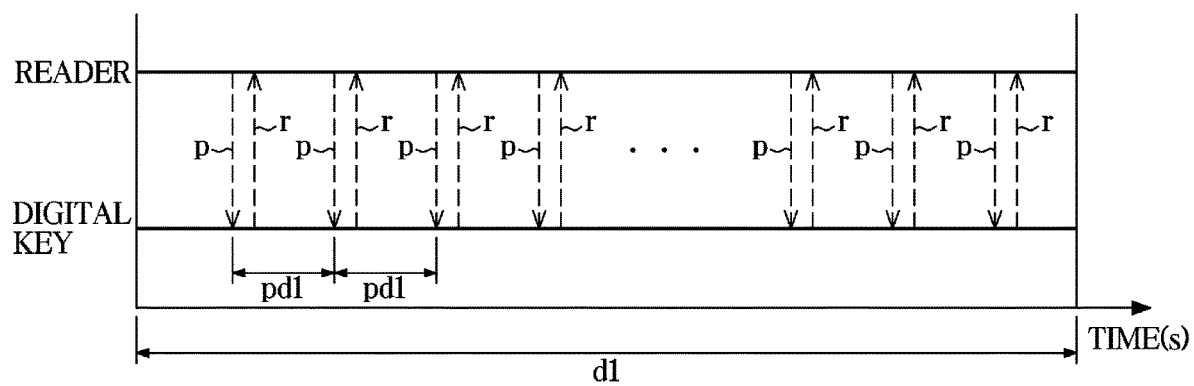
FIG. 5 illustrates an example in which the reader operating in a digital key detection mode transmits a polling signal.
Figure 6:
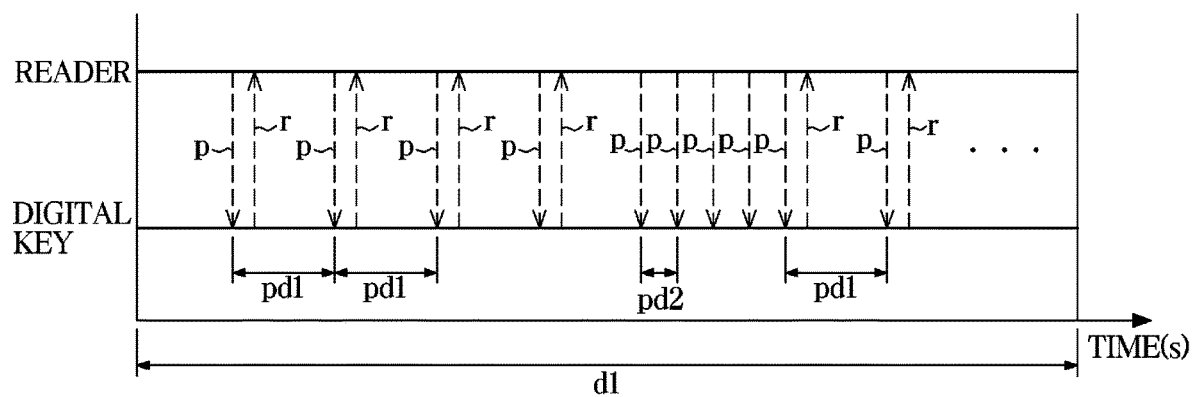
FIG. 6 illustrates another example in which the reader operating in a digital key detection mode transmits a polling signal.
Figure 7:
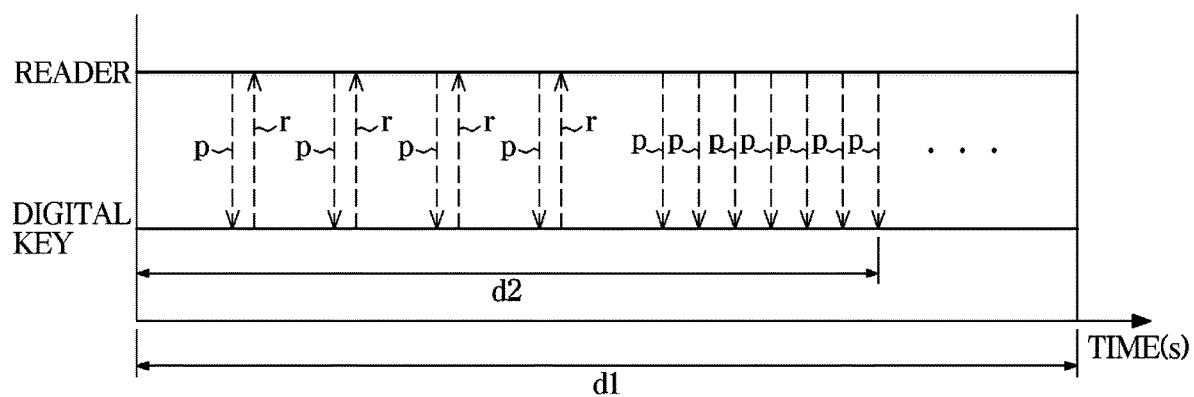
FIG. 7 illustrates another example in which the reader operating a digital key detection mode transmits a polling signal.

FIGS. 5 to 7 illustrate various examples in which the reader operating in the digital key detection mode transmits a polling signal.

Referring to FIG. 5, the reader 100 may transmit a polling signal (p) for detecting the existence of the digital key 200 at a preset period (pd1) while operating in the digital key detection mode.

When the digital key 200 is in a state of being tagged to the reader 100, the reader 100 may receive a response signal (r) corresponding to the polling signal (p) from the digital key 200.

When the reader 100 continuously receives the response signal (r) corresponding to the polling signal (p) from the digital key 200, it may be confirmed that the digital key 200 is in the state of being tagged to the reader 100.

Referring to FIG. 4, the reader 100 operating in the digital key detection mode may not proceed to a data exchange process (S4) even when receiving the response signal (S3) from the digital key 200.

That is, the reader 100 operating in the digital key detection mode may not transmit a signal for waking up the controller 150. As another example, the reader 100 operating in the digital key detection mode may not transmit a message indicating that the digital key 200 has been detected to the controller 150.

Accordingly, the reader 100 may periodically transmit the polling signal (p) and periodically receive the response signal (r) corresponding to the polling signal.

The reader 100 may be switched to the low power mode based on the operation in the digital key detection mode for a preset time (d1) (YES in 1500).

That is, the reader 100 may count the time of operation in the digital key detection mode, and may stop the operation in the digital key detection mode based on the counted time reaching the preset time (d1) and operate in the low power mode.

In this case, the preset time (d1) may be set to about 5 seconds, but is not limited thereto.

According to the disclosure, even when the digital key 200 is continuously tagged to the reader 100 after the transaction succeeds, the user convenience may be promoted by not restarting the unnecessary transaction.

Referring to FIGS. 6 and 7, the reader 100 operating in the digital key detection mode may transmit the polling signal (p) at a period (pd2) shorter than the preset period (pd1) when the polling signal (p) is periodically transmitted according to the preset period (pd1) and the response signal (r) corresponding to the polling signal (p) is not received.

For example, the reader 100 may transmit the polling signal (p) by a preset number of times at the period (pd2) shorter than the preset period (pd1).

As illustrated in FIG. 6, the reader 100 may transmit the polling signal at the preset period (pd1) based on the reception of the response signal (r) corresponding to the polling (p) while transmitting the polling signal (p) at the period (pd2) shorter than the preset period (pd1).

That is, when the reader 100 does not receive the response signal (r) corresponding to the polling signal (p) and then receives the response signal (r) corresponding to the polling signal (p), the reader 100 may again transmit the polling signal (p) at the normal period (pd1).

Similarly, in this case, the reader 100 may count the time to operate in the digital key detection mode, stop the operation in the digital key detection mode based on the counted time reaching the preset time (d1), and operate in the low power mode.

On the other hand, as illustrated in FIG. 7, the reader 100 may stop the operation in the digital key detection mode and operate in the low power mode based on the failure to receive the response signal (YES in 1500) while transmitting the polling signal (p) by the preset number of times at the period (pd2) shorter than the preset period (pd1).

In this case, the reader 100 may operate in the digital key detection mode for the time d2 shorter than the preset time (d1).

According to the disclosure, when it is certain that the digital key 200 is untagged to the reader 100, the reader 100 may be immediately stopped from the digital key detection mode and be switched to the low power mode.

In addition, according to the disclosure, when it is confirmed that the digital key 200 is untagged, the reader 100 may quickly determine whether the digital key 200 is reliably untagged to the reader 100 by transmitting the polling signal at the period (pd2) shorter than the preset period (pd1).

In summary, as illustrated in FIG. 5, when the digital key 200 is continuously tagged to the reader 100, the reader 100 may be automatically switched to the low power mode when the preset time (d1) has elapsed, as illustrated in FIG. 6, even when the digital key 200 is continuously tagged to the reader 100 and momentarily untagged and then tagged again, the reader 100 may be automatically switched to the low power mode when the preset time (d1) has elapsed, and as illustrated in FIG. 7, when the digital key 200 is continuously tagged to the reader 100 and then untagged, the reader 100 may be automatically switched to the low power mode even before the preset time (d1) has elapsed.

According to the digital key detection mode according to the disclosure, because even when the digital key 200 is continuously tagged after the transaction succeeds, the transaction does not start for the preset time (d1), execution of an additional function according to unnecessary transaction success may be prevented.

For example, according to the disclosure, a situation in which the door of the vehicle 1 is locked again as the user who wants to unlock the door of the vehicle 1 continuously tags the digital key 200 to the reader 100 may be prevented.

In an embodiment, the reader 100 may accumulate the number of failures based on the failure of the transaction (No in 1300) and compare the accumulated number of failures with a preset value (n) (1600).

The reader 100 may initialize the accumulated number of failures when operating in the low power mode. Accordingly, the number of failures may be counted from a time point when the reader 100 in the low power mode starts communication with the digital key 200.

In this case, the preset value (n) may be set to 2, but is not limited thereto.

In the case of transaction failure, when the accumulated number of failures is equal to the preset value (n) (YES in 1600), the reader 100 may operate in the digital key detection mode (1400).

That is, when the transaction fails by the number of times corresponding to the preset value (n), the reader 100 may induce the user to untag and then tag the digital key 200 in order to attempt the transaction again.

On the other hand, in the case of transaction failure, when the accumulated number of failures is less than the preset value (n) (NO in 1600), the reader 100 may operate in the transaction mode (1200).

That is, even when the transaction with the digital key 200 has failed by the number of (n-1) times, the reader 100 may be switched to the transaction mode once again and attempt the transaction with the digital key 200.

For example, in the case where the preset value (n) is set to 2, when the transaction with the digital key 200 fails once, the reader 100 may once again execute a series of processes (the NFC initiation process defined in ISO 14443 and the data transaction process defined in ISO 7816) for the transaction.

According to the disclosure, even when the user does not untag the digital key 200 to the reader 100, the reader 100 may repeat the transaction for (n-1) times by continuously tagging.

According to various embodiments, when the digital key 200 is implemented as a smartphone, the controller 150 may request additional authentication information from the digital key 200.

For example, the digital key 200 may request additional biometric authentication information (e.g., fingerprint data) from the smartphone.

In the above case, the user may input a fingerprint without untagging the digital key 200 to the reader 100, thereby more easily performing user authentication.

According to the prior art, when the transaction with the digital key 200 succeeds, the reader 100 operates in the transaction mode. Accordingly, when the user continuously tags the digital key 200 to the reader 100 even after one transaction succeeds, the transaction process is resumed once more, and thus an unnecessary transaction process is performed.

As an example to the contrary, according to the prior art, when the transaction with the digital key 200 fails, the reader 100 operates in the low power mode. Accordingly, when the user continuously tags the digital key 200 to the reader 100 for authentication again after one transaction fails, the transaction process is not resumed, so that the user needs to tag once more after untagging the digital key 200, for authentication again.

According to the disclosure, when the transaction succeeds or the transaction fails more than the preset number of times, the above problem may be solved by operating the reader 100 in the digital key detection mode.

According to the disclosure, when the transaction fails less than the preset number of times, the above problem may be solved by adding an additional transaction opportunity.

In addition, according to the disclosure, after the necessary NFC is terminated, the reader 100 is switched to the low power mode, thereby preventing power consumption.

Some components of the vehicle 1 may be software and/or hardware components such as a field programmable gate array (FPGA) and an application specific integrated circuit (ASIC).

As is apparent from the above, according to the disclosure, even when a transaction fails, the transaction can be retried without an untagging action of a digital key.

In addition, according to the disclosure, when the digital key is continuously tagged despite a success of the transaction, the continuous execution of the transaction can be prevented.

In addition, according to the disclosure, a reader can be switched to allow power mode after a necessary transaction is performed to prevent power consumption.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
   a reader configured to perform communication with a digital key through near field communication (NFC); and
   a controller configured to perform a preset function of the vehicle based on a success of a transaction with the digital key through the reader,
   wherein the reader operates in a first mode for detecting a presence of the digital key based on the success of the transaction, and does not start the transaction even when the digital key is detected while operating in the first mode.

2. The vehicle according to claim 1, wherein the reader is further configured to transmit a polling signal for detecting an existence of the digital key at a preset period while operating in the first mode.

3. The vehicle according to claim 2, wherein the reader is further configured to transmit the polling signal at a period shorter than the preset period when a response signal corresponding to the polling signal is not received.

4. The vehicle according to claim 3, wherein
the reader is further configured to transmit the polling signal at the preset period based on reception of the response signal corresponding to the polling signal while the polling signal is transmitted at the period shorter than the preset period.

5. The vehicle according to claim 3, wherein
the reader is further configured to operate in a second mode based on not receiving the response signal corresponding to the polling signal while the polling signal is transmitted at the period shorter than the preset period, wherein the second mode is a low power mode and the reader is able to detect the digital key while operating in the second mode.

6. The vehicle according to claim 1, wherein
the reader is further configured to operate in a second mode based on the operation in the first mode for a preset time, wherein the second mode is a low power mode and the reader is able to detect the digital key while operating in the second mode.

7. The vehicle according to claim 6, wherein
the reader is further configured to operate in a third mode for starting the transaction based on detecting a change in an electromagnetic field or receiving a starting command from the controller while the second mode is operated.

8. The vehicle according to claim 1, wherein
the reader is further configured to accumulate a number of failures based on a failure of the transaction, operate in a third mode for starting the transaction based on the accumulated number of failures being less than a preset value, and operate in the first mode based on the accumulated number of failures being equal to the preset value.

9. The vehicle according to claim 1, wherein
the reader is provided on a handle of a door, and the controller is further configured to lock or unlock the door based on the success of the transaction.

10. The vehicle according to claim 1, wherein
the reader is provided inside the vehicle, and the controller is further configured to impart a starting authority to a starting system of the vehicle based on the success of the transaction.

11. A control method of a vehicle, which comprises a reader configured to perform communication with a digital key through near field communication (NFC), comprising:
performing, by a controller of the vehicle, a preset function of the vehicle based on a success of a transaction with the digital key through the reader;
operating, by the reader, in a first mode for detecting a presence of the digital key based on the success of the transaction; and
not starting the transaction by the reader even when the digital key is detected while operating in the first mode.

12. The control method according to claim 11, wherein
the operating of the reader in the first mode comprises transmitting a polling signal for detecting a presence of the digital key at a preset period.

13. The control method according to claim 12, wherein
the operating of the reader in the first mode comprises transmitting the polling signal at a period shorter than the preset period when a response signal corresponding to the polling signal is not received.

14. The control method according to claim 13, wherein
the operating of the reader in the first mode comprises transmitting the polling signal at the preset period based on reception of the response signal corresponding to the polling signal while the polling signal is transmitted at the period shorter than the preset period.

15. The control method according to claim 13, further comprising
operating, by the reader, in a second mode based on not receiving the response signal corresponding to the polling signal while the polling signal is transmitted at the period shorter than the preset period, wherein the second mode is a low power mode and the reader is able to detect the digital key while operating in the second mode.

16. The control method according to claim 11, further comprising
operating, by the reader, in a second mode based on the operation in the first mode for a preset time, wherein the second mode is a low power mode and the reader is able to detect the digital key while operating in the second mode.

17. The control method according to claim 15 of 16, further comprising
operating, by the reader, in a third mode for starting the transaction based on detecting a change in an electromagnetic field or receiving a starting command from the controller while the second mode is operated.

18. The control method according to claim 11, further comprising
accumulating, by the reader, a number of failures based on a failure of the transaction, operating in a third mode for starting the transaction based on the accumulated number of failures being less than a preset value, and operating in the first mode based on the accumulated number of failures being equal to the preset value.

19. The control method according to claim 11, wherein
the reader is provided on a handle of a door, and
the performing of the preset function of the vehicle by the controller of the vehicle based on the success of the transaction of the reader with the digital key comprises locking or unlocking the door based on the success of the transaction.

20. The control method according to claim 11, wherein
the reader is provided inside the vehicle, and
the performing of the preset function of the vehicle by the controller of the vehicle based on the success of the transaction of the reader with the digital key comprises imparting a starting authority to a starting system of the vehicle based on the success of the transaction.

* * * * *